(12) United States Patent
Brosch et al.

(10) Patent No.: US 9,388,831 B2
(45) Date of Patent: Jul. 12, 2016

(54) DEVICE HAVING A PNEUMATIC ACTUATING CYLINDER AND CONTROL METHOD

(75) Inventors: Armin Brosch, Gehrden (DE); Detlef Schmidt, Gehrden (DE); Jens Willms, Seelze (DE)

(73) Assignee: WABCO GmbH, Hannover (DE)

( * ) Notice: Subject to any disclaimer, the term of this patent is extended or adjusted under 35 U.S.C. 154(b) by 617 days.

(21) Appl. No.: 13/639,175

(22) PCT Filed: Mar. 7, 2011

(86) PCT No.: PCT/EP2011/001113
§ 371 (c)(1),
(2), (4) Date: Oct. 3, 2012

(87) PCT Pub. No.: WO2011/150990
PCT Pub. Date: Dec. 8, 2011

(65) Prior Publication Data
US 2013/0061746 A1    Mar. 14, 2013

(30) Foreign Application Priority Data

Jun. 4, 2010   (DE) .......................... 10 2010 022 747

(51) Int. Cl.
*F15B 13/00* (2006.01)
*F15B 11/076* (2006.01)
*F15B 15/26* (2006.01)

(52) U.S. Cl.
CPC ............... *F15B 13/00* (2013.01); *F15B 11/076* (2013.01); *F15B 15/26* (2013.01); *F15B 15/262* (2013.01); *F15B 2211/7055* (2013.01); *F15B 2211/72* (2013.01)

(58) Field of Classification Search
CPC .......... F16D 25/14; F16D 25/02; F16D 48/10; F16D 2048/0212; F16B 15/262; F16B 11/076; F16B 2211/715; F16B 2211/72
USPC ....................................... 60/435; 92/9, 10, 143
See application file for complete search history.

(56) References Cited

U.S. PATENT DOCUMENTS

| 217,275 A | 7/1879 | Gately |
| 2,821,172 A | 1/1958 | Randall |
| 4,116,113 A * | 9/1978 | Leclerc ............................ 92/24 |
| 4,619,188 A | 10/1986 | Kimura |
| 4,765,225 A | 8/1988 | Birchard |
| 4,854,218 A * | 8/1989 | Stoll ....................... F15B 15/28 91/1 |
| 4,889,217 A * | 12/1989 | Janiszewski et al. ...... 192/48.91 |
| 6,511,255 B1 | 1/2003 | Mainardi |

FOREIGN PATENT DOCUMENTS

| CN | 201137653 Y * | 10/2008 |
| DE | 77 15 334 U | 9/1977 |
| DE | 28 54 188 | 6/1980 |
| DE | 34 46 974 A1 | 7/1985 |

(Continued)

*Primary Examiner* — Thomas E Lazo
(74) *Attorney, Agent, or Firm* — Kramer Levin Naftalis & Frankel LLP

(57) ABSTRACT

A device includes a pneumatic actuating cylinder and a brake element. The actuating cylinder has at least one pneumatic piston that can be actuated in an arbitrary manner and that is connected to the pneumatic piston or to a component that can be moved by pneumatic piston. Movement of pneumatic piston can be braked or suppressed by an actuation of the brake element.

9 Claims, 2 Drawing Sheets

(56) References Cited

FOREIGN PATENT DOCUMENTS

| | | | |
|---|---|---|---|
| DE | 36 31 844 A1 | | 4/1987 |
| DE | 3631844 A1 | * | 4/1987 |
| DE | 37 08 989 A1 | | 10/1988 |
| DE | 40 10 040 A1 | | 10/1991 |
| DE | 199 17 097 A1 | | 3/2000 |
| FR | 1402010 | | 6/1965 |
| GB | 1106154 | | 3/1968 |
| GB | 2203195 A | * | 10/1988 |
| JP | 01012137 A | * | 1/1989 |

* cited by examiner

DEVICE HAVING A PNEUMATIC ACTUATING CYLINDER AND CONTROL METHOD

FIELD OF THE INVENTION

The invention generally relates to a device having a pneumatic actuating cylinder and to a method for controlling the device.

BACKGROUND OF THE INVENTION

Pneumatic actuating cylinders are used as actuators in various applications. In the field of commercial vehicle technology (trucks, buses), an advantageous application involves realizing an automatic clutch actuation in conjunction with automated gearshift systems via a pneumatic actuating cylinder. This eases the burden on the driver. The shift processes can be completely automated. Since compressed air is already available in commercial vehicles, the use of a pneumatic actuating cylinder is more favorable than a hydraulic actuating cylinder.

The important aspect of clutch actuation, particularly in the area of the clutch biting point, is to be able to perform sensitive actuating movements by means of the actuating cylinder. Traditional vehicle clutches have a force/travel curve, which initially rises roughly linearly up to a maximum value lying roughly around the clutch biting point. On the other side of the maximum value, the characteristic curve falls off again more or less sharply. This has the effect that the pressure built up in the actuating cylinder to achieve the maximum force is too high to hold a position close to the maximum value once the maximum value has been exceeded. This has hitherto been taken into account by relatively complex control algorithms in the actuating cylinder pressure control, such that a relatively sensitive position setting in the area of the clutch biting point is possible. Alternatively, pneumatic valves for pressure control in the actuating cylinder having different aperture cross-sections are connected to one another in parallel, in order thereby to optimise the sensitivity of the setting.

SUMMARY OF THE INVENTION

Generally speaking, it is an object of the present invention to provide a device having a pneumatic actuating cylinder wherein with very little effort a sensitive position setting of the actuating cylinder is possible even with a non-linear counteracting force path of an object to be actuated by the actuating cylinder.

It will be appreciated that the invention has the advantage of facilitating improved fine control in the positioning of the actuating cylinder, even with highly non-linear counteracting force paths, using an easily realized structural enlargement, namely through the provision of a brake element that can be arbitrarily actuated. The brake element may be realized in a variety of embodiments. Any components that allow selective braking or holding of the position of the actuating cylinder's pneumatic piston or else a component that can be moved therewith may be used. To this extent, the term "brake element" not only covers brakes in the traditional sense, but also all other elements that allow this kind of braking or holding of the pneumatic piston or of a component that can be moved therewith, wherein the brake element is capable of arbitrary actuation. By means of the brake element, the pneumatic piston or a component movable therewith can be held in arbitrary positions.

A further advantage of the invention is that fewer valves are required to actuate the device than in conventional solutions. So, for example, only one pneumatic valve is required to actuate the actuating cylinder and one valve to actuate the brake element, rather than four pneumatic solenoid valves, as was previously the case.

In accordance with an embodiment of the invention, the brake element has a double-acting hydraulic cylinder with a hydraulic piston. The hydraulic piston is mechanically connected to the pneumatic piston or a component movable by means of the pneumatic piston. The brake element also includes a valve mechanism that can be actuated arbitrarily in a hydraulic connection line between two hydraulic pressure chambers, which are formed on opposite sides to one another of the hydraulic piston. A hydraulic control volume is thereby added to the pneumatic actuating cylinder. The hydraulic control volume may be relatively small in structure, due to the incompressibility of the hydraulic medium. In this case, it is not necessary for an elaborate complete hydraulic system with a pump to be provided, but simply a compact, self-contained system. In this way, the maintenance costs of the brake element can be kept down.

The addition of a hydraulic control volume has the advantage that hydraulic systems offer good control performance, particularly in that the hydraulic medium is incompressible and therefore allows selective braking and holding of the pneumatic piston at arbitrarily defined positions.

In accordance with another embodiment of the invention, the valve mechanism includes at least one open setting, in which the hydraulic pressure chambers are connected, and at least one closed setting, in which the hydraulic pressure chambers are closed off from one another. This permits defined holding of the pneumatic piston in arbitrarily predetermined positions.

In accordance with a further embodiment of the invention, the brake element has an arbitrarily actuatable brake with at least one brake lining, which is movable towards the pneumatic piston or a component movable by means of the pneumatic piston, particularly a piston rod, when the brake is actuated. This advantageously allows the use of the widest variety of designs for the brake. For example, the brake may be hydraulically actuatable or electromotively actuatable. In a preferred embodiment, a pneumatically actuatable brake is used. The same pressure medium can thereby be used as the pressure medium for actuating the brake as for the actuation of the pneumatic actuating cylinder. This allows a particularly cost-effective realization of the arbitrarily actuatable brake element. The brake may be configured as a friction brake, for example.

In accordance with yet another embodiment of the invention, the pneumatic actuating cylinder is designed as a single-acting clutch actuation cylinder for actuating a vehicle clutch. This allows simple actuation of the pneumatic actuating cylinder with only one pneumatic valve.

In accordance with a still further embodiment of the invention:
  a) the pneumatic actuating cylinder has a working side and a rear side facing away from the working side,
  b) the actuating movement of the pneumatic cylinder can be delivered at the working side to a component located in the vicinity, and
  c) the brake element is disposed on the rear side.

This allows a particularly compact structure of the inventive device, so that the device can easily be integrated into existing applications.

In a method for controlling an inventive device:
a) insofar as the pneumatic piston is to be extended, a compressed air chamber of the pneumatic actuating cylinder is acted on by compressed air, whereupon the brake element is not actuated,
b) insofar as the pneumatic piston is to be retracted, compressed air is vented from the compressed air chamber, whereupon the brake element is not actuated, and
c) insofar as the pneumatic piston is not to be moved, the brake element is actuated.

The advantage of this as compared with conventional methods is that only a kind of servo control is required. The actual precise positioning may be achieved through actuation of the brake element. Only the force required to move the actuating cylinder, e.g., to disengage the clutch, is thereby provided by the compressed air.

In accordance with another embodiment of the invention, the brake element is actuated shortly before or upon attainment of a required position of the pneumatic piston or a component that can be actuated by means of the pneumatic piston. Safe, reliable positioning can thereby be achieved. A delayed reaction inherent in the brake element can be compensated for by actuating the brake element shortly before the required position is reached. It should be understood that this method may be realized by corresponding software programming of an electronic control unit controlling the brake element, for example.

In accordance with a further embodiment of the invention, a vehicle clutch can be actuated by means of the pneumatic actuating cylinder. The brake element is actuated on reaching the disengaging position of the vehicle clutch.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The invention is described in greater detail below with reference to exemplary embodiments set forth in the appended drawings, in which.

In the figures, the same reference numbers are used for corresponding elements.

DETAILED DESCRIPTION OF THE PREFERRED EMBODIMENTS

Figure 1:
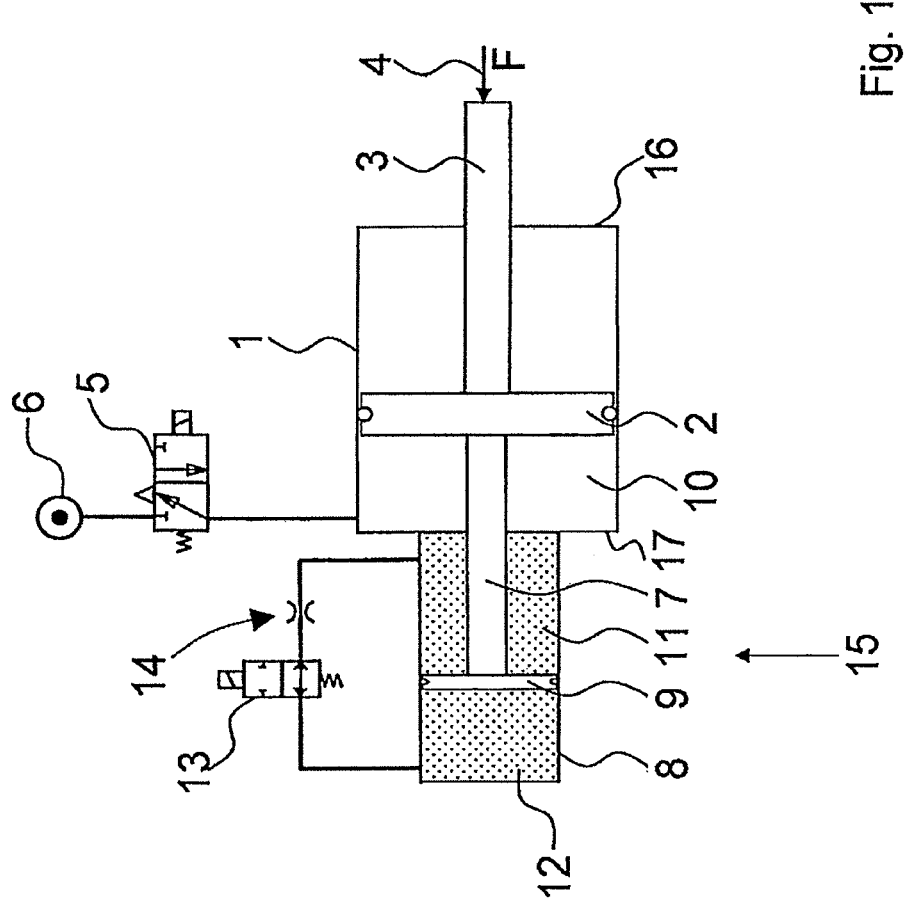
FIG. 1 shows a first embodiment of a device according to the present invention with a pneumatic actuating cylinder.

FIG. I shows a pneumatic actuating cylinder 1 that has a pneumatic piston 2. A piston rod 3 is connected to the pneumatic piston 2, and is shown projecting from the actuating cylinder 1 to the right in FIG. 1 to actuate an external object. In accordance with the exemplary embodiment, it is assumed that a vehicle clutch is actuated by means of the piston rod 3. The vehicle clutch is symbolized by an arrow 4 in the diagram; the arrow indicating the direction of action of the counteracting force F exerted on the piston rod 3 by the vehicle clutch.

The actuating cylinder 1 has a compressed air chamber 10. The compressed air chamber 10 is connected to a compressed air source 6 via a pneumatic valve, e.g., in the form of an electromagnetically actuatable valve 5 designed as a 3/2-way valve. Instead of the valve 5 represented with two settings, a 3-setting valve may also be used, which also exhibits a pressure-retaining setting, in addition to the switch settings provided in the valve 5 shown.

By means of the valve 5, compressed air can be fed from the compressed air source 6 into the compressed air chamber 10 or from the compressed air chamber 10 into the atmosphere. Through a corresponding pressure setting in the compressed air chamber 10, a corresponding force is exerted on the vehicle clutch 4 via the pneumatic piston 2 and the piston rod 3, via which the vehicle clutch can be actuated in the disengagement direction.

On its side facing away from the piston rod 3, the pneumatic piston 2 has a rearward piston rod 7, which projects from the housing of the actuating cylinder 1. Likewise on the rear side 17, i.e., on the side 16 of the actuating cylinder 1 facing away from the piston rod 3, a brake element 15 is disposed, which has a dual-acting hydraulic cylinder 8. The hydraulic cylinder 8 is screwed or flange-mounted on the housing of the pneumatic actuating cylinder 1, for example. The hydraulic cylinder 8 has a hydraulic piston 9, which is connected to the rearward piston rod 7. Through the connection via the rearward piston rod 7, the pneumatic piston 2 and the hydraulic piston 9 always perform the same movements.

A first hydraulic pressure chamber 11 is arranged on the one side of the hydraulic piston 9. A second hydraulic pressure chamber 12 is arranged on the other side of the hydraulic piston 9. The hydraulic pressure chambers 11, 12 are connected to a hydraulic valve 13 via hydraulic lines. The hydraulic valve 13 has two switch settings, namely an open setting, in which the hydraulic pressure chambers 11, 12 are connected, and a closed setting, in which the hydraulic pressure chambers 11, 12 are closed off from one another. The hydraulic valve 13 may be designed as an electromagnetically actuatable 2/2-way valve, for example. By actuating the electromagnets of the hydraulic valve 13, either the open or closed position may be activated.

Additionally, a throttle 14 is disposed in the connection line between the hydraulic valve 13 and the hydraulic pressure chamber 11. The flow between the hydraulic chambers 11, 12 may be set at a desired value via the throttle 14.

Figure 2:
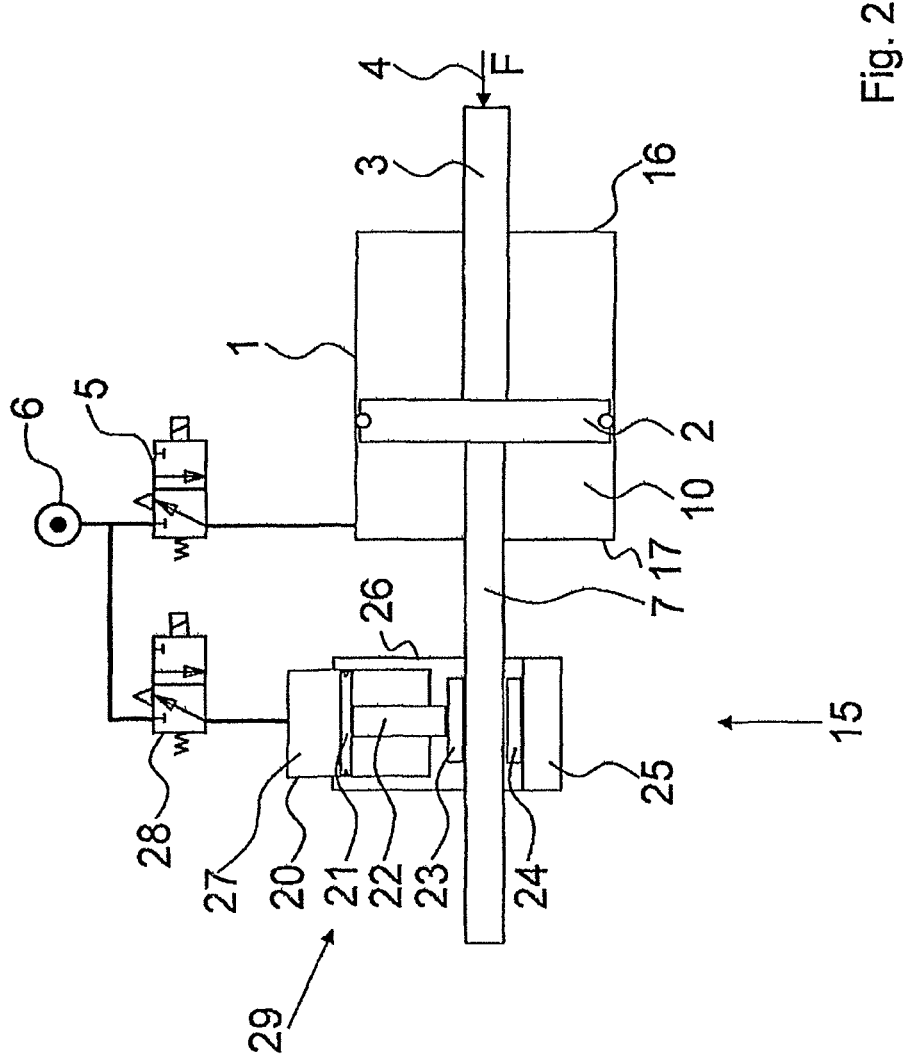
FIG. 2 shows a second embodiment of a device according to the present invention with a pneumatic actuating cylinder.

FIG. 2 shows a second embodiment of a device with a pneumatic actuating cylinder. In relation to the actuating cylinder 1, the pneumatic valve 5 and the compressed air source 6, the description of these elements in accordance with the embodiment depicted in FIG. 1 apply equally to the embodiment depicted in FIG. 2.

The brake element according to FIG. 2 has a brake that can be pneumatically actuated. The brake has a pneumatic actuating cylinder 20. The pneumatic actuating cylinder 20 has a pneumatic piston 21 and a piston rod 22, which is connected to a first brake lining 23. Via compressed air actuation of a compressed air chamber 27 of the actuating cylinder 20, the brake lining 23 can be pressed against the rearward piston rod 7 via the pneumatic piston 21 and the piston rod 22. A second brake lining 24 is arranged on the opposite side of the rearward piston rod 7 as the counter-bearing of the first brake lining 23. The second brake lining 24 is supported by a counter-bearing block 25, which is connected to the actuating cylinder 20 via a connection plate 26. The brake linings 23, 24 may act on the rearward piston rod 7 in the form of a friction brake, for example. The rearward piston rod 7 may also be roughened to improve the braking action or provided with a defined texture or grooves.

The compressed air chamber 27 of the actuating cylinder 20 can be connected via a second pneumatic valve 28, which can be actuated electromagnetically, either to the compressed air source 6 or to the atmosphere. In this way, pressure in the compressed air chamber 27 can be increased or reduced arbitrarily and the brake therefore actuated arbitrarily.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A device, comprising a pneumatic actuating cylinder, the actuating cylinder including at least one pneumatic piston; and a brake element connected to one of the at least one pneumatic piston and a component movable by the at least one pneumatic piston, the at least one pneumatic piston and the component being movable along a first plane, the brake element comprising an additional actuating cylinder having a piston arbitrarily actuatable along a second plane substantially orthogonal to the first plane to brake movement of the at least one pneumatic piston.

2. The device according to claim 1, wherein the brake element further comprises at least one brake lining movable towards one of the at least one pneumatic piston and the component movable by the at least one pneumatic piston when the brake element is actuated.

3. A method for controlling the device according to claim 1, the method comprising at least one of:
   a) extending the at least one pneumatic piston via compressed air acting on a compressed air chamber of the pneumatic actuating cylinder, whereupon the brake element is not actuated;
   b) retracting the at least one pneumatic piston by venting compressed air from the compressed air chamber, whereupon the brake element is not actuated, and
   c) holding the at least one pneumatic piston substantially stationary, whereupon the brake element is actuated.

4. The method according to claim 3, further comprising actuating the brake element one of shortly before and upon attainment of a predefined position of one of the at least one pneumatic piston and the component movable by the at least one pneumatic piston.

5. The device according to claim 1, wherein the component movable by the at least one pneumatic piston is a piston rod.

6. A device comprising a pneumatic actuating cylinder, the actuating cylinder including at least one pneumatic piston; and a brake element connected to one of the at least one pneumatic piston and a component movable by the at least one pneumatic piston, the brake element being arbitrarily actuatable, the brake element being configured to one of brake and suppress a movement of the at least one pneumatic piston when actuated, wherein the actuating cylinder is a single-acting clutch actuation cylinder for actuating a vehicle clutch.

7. A device comprising a pneumatic actuating cylinder, the actuating cylinder including at least one pneumatic piston; and a brake element connected to one of the at least one pneumatic piston and a component movable by the at least one pneumatic piston, the brake element being arbitrarily actuatable, the brake element being configured to one of brake and suppress a movement of the at least one pneumatic piston when actuated, wherein:
   a) the actuating cylinder has a working side and a rear side facing away from the working side,
   b) actuating movement of the actuating cylinder being deliverable at the working side to a proximately located vehicle component, and
   c) the brake element is disposed on the rear side.

8. A method for controlling a device, the device comprising a pneumatic actuating cylinder including at least one pneumatic piston, the device also including a brake element connected to one of the at least one pneumatic piston and a component movable by the at least one pneumatic piston, the brake element being arbitrarily actuatable, the brake element being configured to one of brake and suppress a movement of the at least one pneumatic piston when actuated, the method comprising:
   at least one of:
   a) extending the at least one pneumatic piston via compressed air acting on a compressed air chamber of the actuating cylinder, whereupon the brake element is not actuated;
   b) retracting the at least one pneumatic piston by venting compressed air from the compressed air chamber, whereupon the brake element is not actuated; and
   c) holding the at least one pneumatic piston substantially stationary, whereupon the brake element is actuated;
   actuating a vehicle clutch by the actuating cylinder; and
   actuating the brake element when a disengagement position of the vehicle clutch is reached.

9. A device comprising a pneumatic actuating cylinder, the actuating cylinder including at least one pneumatic piston; and a brake element connected to one of the at least one pneumatic piston and a component movable by the at least one pneumatic piston, the brake element being arbitrarily actuatable, the brake element being configured to one of brake and suppress a movement of the at least one pneumatic piston when actuated, wherein:
   a) the actuating cylinder has a working side and a rear side facing away from the working side,
   b) actuating movement of the actuating cylinder being deliverable at the working side to a vehicle clutch, and
   c) the brake element is disposed on the rear side.

* * * * *